United States Patent [19]
Hofmann

[11] 4,180,529
[45] Dec. 25, 1979

[54] ACRYLIC MULTISTAGE GRAFT COPOLYMER PRODUCTS AND PROCESSES

[75] Inventor: George H. Hofmann, Parkersburg, W. Va.

[73] Assignee: E. I. Du Pont de Nemours and Company, Wilmington, Del.

[21] Appl. No.: 3,089

[22] Filed: Jan. 12, 1979

Related U.S. Application Data

[63] Continuation-in-part of Ser. No. 858,887, Dec. 8, 1977, abandoned.

[51] Int. Cl.² .................. C08L 33/08; C08L 33/10; C08L 33/12
[52] U.S. Cl. ........................................ 525/85; 525/80
[58] Field of Search ............................ 260/885, 876 R

[56] References Cited

U.S. PATENT DOCUMENTS

| 3,562,235 | 2/1971 | Ryan | 260/885 |
| 3,787,522 | 1/1974 | Dickie et al. | 260/836 |
| 3,793,402 | 2/1974 | Owens | 260/876 R |
| 3,804,925 | 4/1974 | Kato et al. | 260/885 |
| 4,052,525 | 10/1977 | Ide et al. | 260/885 X |

OTHER PUBLICATIONS

Emulsion Polymerization Theory and Practice, D. Blackley, John Wiley & Sons, 1975, p. 322.

Primary Examiner—Carman J. Seccuro

[57] ABSTRACT

A resilient, acrylic graft polymer is produced by multistage, sequential polymerization in which the first stage is elastomeric, the second stage is nonelastomeric, the third stage is elastomeric and the fourth, and final stage is nonelastomeric. Upon blending with a nonresilient methacrylic matrix resin, followed by molding, an impact resistant molded product is obtained which has low stress-whitening, generally does not show substantial crack propagation on impact and does not readily break on subjection to fold endurance tests.

14 Claims, No Drawings

ACRYLIC MULTISTAGE GRAFT COPOLYMER PRODUCTS AND PROCESSES

CROSS-REFERENCE

This application is a continuation-in-part of Ser. No. 858,887, filed Dec. 8, 1977 now abandoned.

FIELD OF THE INVENTION

This invention relates to resilient, acrylic graft polymers, and to blends of such polymers with hard nonresilient thermoplastic methacrylate matrix resins.

BACKGROUND OF THE INVENTION

Resilient, acrylic graft polymers are produced by a multi-stage, sequential polymerization technique which comprises alternately producing resilient and nonresilient layers around an acrylic core material. These resilient polymers are ordinarily admixed with a hard nonresilient thermoplastic methacrylic matrix resin in order to provide resiliency in articles molded from the resulting blend. Presence of the resilient acrylic graft polymer reduces susceptibility of the hard matrix resin in molded form to adverse effects resulting from impact with foreign objects.

However, the resilient acrylic graft polymers tend to cause the resulting blend to haze or whiten when articles molded from the blend are subjected to stress. This phenomenon is called stress whitening. To reduce the degree of stress whitening, Owens U.S. Pat. No. 3,793,402 suggests that the resilient, acrylic graft polymer be one in which the resilient layer both (1) surrounds a hard, nonresilient core and (2) is surrounded by a hard, nonresilient shell layer. The Owens patent indicates that if the resilient portion of the acrylic graft polymer is in the core (i.e., the first stage), such arrangement contributes to an increased tendency to whiten under stress.

Continued improvement is sought in the properties of articles molded from the blend of the acrylic graft polymer and the matrix resin. It has now been discovered that when the acrylic graft polymer of this invention is employed, articles from the blend have low stress whitening even though a resilient core is present in the acrylic graft polymer. Furthermore, at high loadings of selected acrylic graft polymer in the blend, the articles tend to have higher Gardner Impact values than those described in the Owens patent. In addition, some of the acrylic graft polymers of this invention when blended with the matrix resin tend to have higher fold endurance values than those described in the Owens patent.

SUMMARY OF THE INVENTION

This invention provides a resilient, acrylic, multistage, sequentially produced graft polymer comprising:

(a) an elastomeric (resilient) first stage, i.e., core (defined by having glass transition temperature of between about −60° C. and 25° C., and preferably −35° to −20° C.) comprising about 1-25% (preferably 3-20% and most preferably 10-20%) by weight of the polymer;

(b) a nonelastomeric (nonresilient), relatively hard second stage (glass transition temperature greater than 25° C.), comprising about 5-65% (preferably 15-30%) by weight.

(c) an elastomeric (resilient) third stage defined as in part (a) comprising about 30-75% (preferably 40-60%) by weight;

(d) a nonelastomeric (nonresilient), relatively hard fourth stage defined as in part (b) and which is usually the last stage comprising about 5-40% (preferably 10-20%) by weight.

The first stage is polymerized from a monomer mixture of 50 to 100 weight percent of at least one alkyl acrylate wherein the alkyl group contains 1 to 8 carbon atoms, 0 to 50 weight percent of another copolymerizable monoethylenically unsaturated monomer, 0 to 5 weight percent of a copolymerizable polyfunctional crosslinking monomer and 0 to 5 weight percent of a copolymerizable graftlinking monomer.

The second stage is polymerized in the presence of the first stage product from a monomer mixture of 70 to 100 weight percent of at least one alkyl methacrylate wherein the alkyl group has 1 to 4 carbon atoms, 0 to 30 weight percent of another copolymerizable monoethylenically unsaturated monomer, 0 to 5 weight percent of a copolymerizable polyfunctional crosslinking monomer and 0 to 5 weight percent of a copolymerizable graftlinking monomer.

The third stage is polymerized in the presence of the first and second stage product from a monomer mixture of 50 to 100 weight percent of at least one alkyl acrylate wherein the alkyl group contains 1 to 8 carbon atoms, 0 to 50 weight percent of another copolymerizable monoethylenically unsaturated monomer, 0 to 5 weight percent of a copolymerizable polyfunctional crosslinking monomer and 0 to 5 weight percent of a copolymerizable graftlinking monomer.

The fourth stage is polymerized in the presence of the product of the first three stages from a monomer mixture of 70 to 100 weight percent of at least one alkyl methacrylate wherein the alkyl group has 1 to 4 carbon atoms, 0 to 30 weight percent of another copolymerizable monoethylenically unsaturated monomer, 0 to 5 weight percent of a copolymerizable polyfunctional crosslinking monomer and 0 to 5 weight percent of a copolymerizable graftlinking monomer.

The combined amounts of stages 1 and 3 comprise at least 40% by weight, based on weight of polymer.

Preferably the final particle size will be between 0.15 and 0.35 micron.

Blends of the resilient graft polymer with a hard, nonresilient thermoplastic methacrylate resin are also provided by this invention.

DESCRIPTION OF THE INVENTION

The resilient acrylic graft polymer of this invention can be produced by a multi-stage sequential emulsion polymerization in which each successive stage is polymerized in the presence of the previously formed stages. Thus, each successive stage is polymerized as a layer on top of the immediately preceding stage. Depending on the properties desired, the first stage may comprise a seed or may comprise a seed surrounded by more first stage. Thus, the first stage or a portion of the first stage is used as a seed or core around which either more of the first stage or the subsequent stages are polymerized in layers. The general polymerization procedure is well known in the art. The first stage or a portion thereof, which forms the seed provides a mechanism for determining final particle size; for, once the seed particles are formed, subsequent polymerization of the stage tends to result in polymerization on the existing particles, i.e., generally new particles do not form. Thus, the final particle size is controlled by the number of first stage seed particles. Generally, the final particle size should preferably be between about 0.15-0.35 microns and most preferably 0.2-0.3 microns. Within these particle sizes, the resulting blend has been found to have high ductility, i.e., upon impact, molded articles made from the blend do not tend to have cracks propagating from the area of impact.

The polymerization of each stage is carried out in the presence of a catalyst and an emulsifier at ordinary and usual levels. Useful emulsifying agents include alkylbenzenesulfonates, alkylphenoxypolyethylene sulfonates, sodium lauryl sulfate, salts of long chain amines, salts of long chain carboxylic and sulfonic acids, and compounds containing long chain hydrocarbon groups coupled to alkali metal carboxylates, sulfonates, or sulfate esters. Useful catalysts include alkali metal persulfates.

Polymerization temperatures can range from 0°-125° C. with about 60°-90° C. preferred.

The alkyl acrylate used in elastomeric stages 1 and 3 can be methyl acrylate, ethyl acrylate, propyl acrylate, butyl acrylate, 2-ethylhexyl acrylate or the like. Preferably, butyl acrylate is employed.

The alkyl methacrylate used in nonelastomeric stages 2 and 4 can be methyl methacrylate, ethyl methacrylate, propyl methacrylate or butyl methacrylate. Methyl methacrylate is preferred.

The copolymerizable monoethylenically unsaturated monomer which can be optionally employed in any of stages 1 through 4 can be any of the alkyl acrylates or alkyl methacrylates described previously herein or can be styrene, α-methyl styrene, monochlorostyrene, butyl styrene, acrylonitrile, methacrylonitrile, or the like. Preferably this copolymerizable monomer is present in each stage, and for elastomeric stages 1 and 3, it preferably is styrene, and for nonelastomeric stages 2 and 4 it preferably is ethyl acrylate.

The copolymerizable graftlinking monomer can be allyl acrylate, allyl methacrylate, diallyl maleate, diallyl fumarate, crotyl methacrylate, crotyl acrylate and the like. Preferably a graftlinking monomer is present in all stages except the last stage. Preferably also, the graftlinking monomer is allyl methacrylate.

The polyfunctional crosslinking monomer can be ethylene glycol dimethacrylate, 1,3-butylene glycol dimethacrylate, 1,4-butylene glycol dimethacrylate, propylene glycol dimethacrylate, divinyl benzene, trivinyl benzene, ethylene glycol diacrylate, 1,3-butylene glycol diacrylate or the like. The degree of resiliency or nonresiliency is measured herein by the glass transition temperature.

The resilient acrylic graft polymers of this invention are blended with a nonresilient methacrylate resin to add resiliency to articles molded from the blend. The amount of resilient graft polymer employed is dependent upon the modification of properties desired in the methacrylate resin. Generally, the graft polymer will be present in an amount of about 5-80 percent by weight of blend and preferably 30-60 percent. At higher loadings of graft polymer, e.g., about 50% or more, it has been found that impact resistance (determined by the Gardner Impact test) is better than when a hard core graft polymer of the art is employed in place of the graft polymer used herein. The polymer and the resin can be blended by any known procedure; however, it is convenient to compound the two ingredients on a roll mill, at for example, 200°-230° C. for 10-20 minutes. The nonresilient methacrylate resin can be the homopolymer of an alkyl methacrylate wherein the alkyl group has 1-4 carbon atoms, or can be a copolymer of two or more such alkyl methacrylate and another copolymerizable monoethylenically unsaturated monomer. Any of the alkyl methacrylates and copolymerizable monoethylenically unsaturated monomers previously described can be used. Preferably the methacrylate resin will contain 75-100% of the alkyl methacrylate and most preferably at least 90% by weight.

The blended product is an impact resistant and fold resistant resin with low stress whitening in molded form and is employed to make film, sheets or shaped articles. If desired, light stabilizers, oxidation inhibitors, fillers, colorants, lubricants and the like may be added to the blend.

EXAMPLES

In the Examples which follow, the property test result values recited were obtained as follows:

Gardner Impact (GI) values were determined using a model IG-1120 tester by placing a compression molded plaque made as described in the Examples below on a plate over a 0.64 inch diameter hole. A two pound weight was dropped on an impact head having 0.5 inch radius tip resting on the plaque. The impact (measured in in-lbs) required to break the plaque was found by using 2 inch-pound weight increments and is determined by either recording the maximum pass value (highest impact value at which the plaque does not fail) or by calculating the mean value using the Bruceton staircase method.

Stress whitening was determined by visual observation after subjecting plaques made in the Examples below to the Gardner Impact test.

Ductility was determined by recording the number of ductile breaks (i.e., all breaks resulting from the G.I. test that are not straight radical cracks propagating beyond the 0.64 inch diameter impact circle) and recording the number of total breaks and inserting these recorded values into the equation:

$$\% \text{ Ductility} = \frac{\text{Number of Ductile Breaks}}{\text{Number of Total Breaks}} \times 100.$$

Particle size of the acrylic graft polymers was determined by evaluation of an integral involving the Rayleigh-Gans light scattering factor for spheres, as described by F. W. Billmeyer, J. Am. Chem. Soc. 76, 4636 (1958). The results are expressed in the form of a graph which relates particle diameter to experimentally observed optical density values, based on the equation:

$$D/A_o = 1.5 \times 10^7 (d^3/F_T) \quad (1)$$

where $$D = \text{optical density} = \log(100/\% \text{ transmission}) \quad (2)$$

$$A_o = R^2 c T \rho \quad (3)$$

R = refractive index gradient
c = particle concentration (g./cc)
T = optical cell thickness, cm.
ρ = particle density, g./cc
d = particle diameter, microns, and
$F_T$ = size parameter, function of d only at constant wavelength The refractive index gradient R is given with good accuracy by $$R = (n_p - n_o)/\rho \quad (4)$$

where $n_p$ = particle refractive index, and $n_o$ = substrate refractive index (The coefficient $1.5 \times 10^7$ applied to measurements made with the Hg green line of $\lambda = 0.546$ microns only.) $F_T$ is a known function of d, so values of $D/A_o$ were calculated and tabulated as a function of d and used to construct the log-log plot. It may be useful to point out here that $F_T$ is practically unity for small particles, so that log d vs. log $D/A_o$ is essentially linear with a slope $\frac{1}{3}$ for sizes up to about 0.08 microns.

Experimentally, the emulsion is diluted so that the optical transmission is in the approximate range 20–80% in the cell selected (thickness, T = 1, 2.5 or 5 cm.). The transmission at $\lambda = 0.546$ microns is measured accurately and the optical density calculated (Eq. 2). $A_o$ is calculated from Eq. 3, using the known values of c, T, and $\rho$, and R from Eq. 4. The quotient $D/A_o$ referred to the graph will then give the particle diameter characteristic of the emulsion. For illustration assume that a liquid of index $n_p = 1.5$ and density $\rho = 1.2$ is emulsified in water ($n_o = 1.333$), the emulsion diluted to 0.1% (c = 0.001), and the transmission (relative to water) or the dilution is found to be 50% in a 5 cm. cell. Then $$D = \log(100/50) = 0.30 \text{ (from Eq. 2)}$$

$$R = (1.5 - 1.333)/1.2 = 0.139 \text{ (from Eq. 4)}$$

$$A_o = (0.139)^2(0.001)(5)(1.2) = 1.159 \times 10^{-4}$$

$$D/A_o = 2.59 \times 10^3$$

From the graph the diameter corresponding to $D/A_o = 2.59 \times 10^3$ is 0.056 microns.

Fold endurance values were obtained by preparing films of the blended resin of thickness described in the Examples below by compression molding at 240°–250° C. and 40M lb force. They were cut into $\frac{1}{2}$" wide strips (4–6" long) and subjected while under tension provided by a $\frac{1}{2}$ lb. weight at 22° C. to 180 degree bends on a MIT Folding Endurance tester (Tinius-Olsen Testing Machine, Co.) until the sample broke.

The following examples illustrate the invention in greater detail.

EXAMPLE 1

Polymerization

Into a 3 liter resin kettle, equipped with a reflux condenser and a $N_2$ sweep, was placed 1000 g of oxygen free ($N_2$ flushed overnight) demineralized water, 36.0 g of ethyl acrylate (EA), 0.2 of allylmethacrylate (ALMA) and 0.52 grams of a 75% solution of sodium dioctyl sulfosuccinate (SDOSS), an emulsifier. The mixture (Stage 1) was vigorously stirred for 15 minutes while the temperature was raised, using a surrounding water bath, to 80°C. At 15 minutes, 5 ml of 1% $K_2S_2O_8$ in demineralized water (KPS) was added to initiate reaction. At 25 minutes an additional 10 ml of KPS was added. At approximately 26 minutes a mixture (Stage 2) of 108 g of methyl methacrylate (MMA), 36 g of EA, 0.4 g of ALMA and 2.08 g of SDOSS was gradually added at a rate of about 3 ml/min. All of Stage 2 was in the kettle after 85 minutes. At 110 minutes 25 ml of KPS was added to the kettle and 5 minutes later (115 minutes) a mixture (Stage 3) of 190.6 g of butyl acrylate (BA), 44.7 g of styrene (S), 4.7 g of ALMA and 1.15 g of SDOSS was gradually added at a rate of about 10 ml/min. At 141 min. 20 ml of KPS was added to the kettle. At 144 min. all of Stage 3 was in the kettle. Stage 3 reached greater than 99% conversion (by gas chromatography) at 260 minutes. At 270 minutes 12 ml of KPS was added and 5 minutes later (275 minutes) a mixture (Stage 4) of 169.2 g of MMA and 10.8 g of EA was gradually added at a rate of about 4 ml/min. At 330 minutes all of Stage 4 was in the kettle and at 360 minutes the reaction was complete and the polymer latex was cooled to room temperature. Stage 1 comprised 6% by weight of the polymer; Stage 2, 24%; Stage 3, 40%; and Stage 4, 30%.

Isolation

The polymer latex was passed through a coarse filter cloth to remove coagulum. A 500 ml portion of this latex was slowly added to a vigorously stirred hot (70°80° C.) solution of 1% Epsom salt (1000 ml). The resultant coagulated polymer was filtered, washed 3 times, and dried in a vacuum over at 60° C. overnight to obtain a resilient acrylic graft polymer. First stage Tg was −21° C.; second stage Tg was +64° C.; third stage Tg was −35° C.; and fourth stage Tg was +94° C. The Tg values in this Example and all the other Examples were determined as described in "Rohm & Haas' Acrylic Glass Temperature Analyzer CM-24L/cb."

Compounding and Testing

The resilient acrylic graft polymer was compounded with a methyl methacrylate/ethylacrylate (MMA/EA) copolymer on a roll mill (at approx. 220° C.) for 15 minutes. The MMA/EA copolymer contained about 6% EA and 94% MMA and was compounded with 62.5 percent of the graft polymer. The blended resin was compression molded at 240° C. and 40,000 lb force into a 60 ml thick plaque. Visual inspection showed the plaque had low haze. Upon carrying out the Gardner Impact test, the molded blend was determined to have a Gardner Impact (GI) value of 10 in-lb determined by the Bruceton method. The plaque was determined to have a Ductility value of 18%, and the particle size of the acrylic graft polymer was 0.155 micron. The plaque exhibited low stress whitening.

EXAMPLE 2

Using the procedure of Example 1, a four (4) stage resilient acrylic graft polymer of the following composition was made with the sequence of steps indicated.

| Stage 1(4%) | Stage 2(25%) | Stage 3(56%) | Stage 4(15%) |
|---|---|---|---|
| 19.1 g BA | 141.0 g MMA | 266.8 g BA | 84.6 g MMA |
| 4.5 g S | 9.0 g EA | 62.5 g S | 5.4 g EA |
| 0.5 g ALMA | 0.6 g ALMA | 6.7 g ALMA | |
| 0.2 g SDOSS | 1.5 g SDOSS | 2.3 g SDOSS | |
| Tg −35° C. | Tg +94° C. | Tg −35° C. | Tg +94° C. |

| Time (Minutes) | Reaction Steps |
|---|---|
| 00 | Added Stage 1 |
| 20 | Add 8 ml KPS |
| 50 | Add 8 ml KPS |
| 55 | Start addition of Stage 2 |
| 80 | All of Stage 2 is in |
| 98 | Add 25 ml KPS |
| 100 | Start addition of Stage 3 |
| 136 | Add 25 ml of KPS |
| 137 | All of Stage 3 is in |
| 270 | Add 8 ml KPS |
| 275 | Start addition of Stage 4 |
| 299 | All of Stage 4 is in |
| 320 | Cooled to room temperature |

The graft polymer was isolated and compounded as in Example 1 except that the graft polymer in the blend was 40%. The resultant plaque exhibited low visual haze, a Gardner Impact (GI) of 16 in-lb determined by recording the maximum pass value, and exhibited low stress whitening after subjection to the GI test. The plaque exhibited a ductility value of 100% and the acrylic graft polymer had a particle size of about 0.270 micron.

EXAMPLE 3

Using the procedure of Example 1, a four-stage resilient acrylic graft polymer of the following composition was made with the sequence of steps indicated.

| Stage 1(4%) | Stage 2(25%) | Stage 3(56%) | Stage 4(15%) |
|---|---|---|---|
| 19.2 g BA | 140.4 g MMA | 268.7 g BA | 84.6 MMA |
| 4.2 g S | 9.0 g EA | 59.1 g S | 5.4 EA |
| 0.4 g ALMA | 0.6 g ALMA | 6.7 g ALMA | 0.5 EDMA |
| 0.1 g EDMA* | 0.6 g EDMA | 1.7 g EDMA | |
| 0.2 g SDOSS | 1.6 g SDOSS | 2.6 g SDOSS | |
| Tg −35° C. | Tg +94° C. | Tg −35° C. | Tg +94° C. |
| Time (Minutes) | | Reaction Steps | |
| 00 | | Add Stage 1 | |
| 15 | | Add 12 ml KPS | |
| 75 | | Add 8 ml KPS | |
| 80 | | Start addition of Stage 2 | |
| 116 | | All of Stage 2 is in | |
| 126 | | Add 25 ml KPS | |
| 131 | | Start addition of Stage 3 | |
| 183 | | Add 25 ml KPS | |
| 188 | | All of Stage 3 is in | |
| 295 | | Add 12 ml KPS | |
| 300 | | Start addition of Stage 4 | |
| 327 | | All of stage 4 is in | |
| 340 | | Cooled to room temperature | |

*EDMA = ethylene glycol dimethacrylate crosslinking agent.

The graft polymer was isolated and compounded as in Example 2. The resultant plaque had low haze, and upon subjection to the Gardner Impact test had a GI of 16 in-lb determined by the maximum pass method, had low stress whitening, and a ductility value of 95%. The acrylic graft polymer prepared in this Example has a particle size of 0.272 microns.

EXAMPLE 4

Using the procedure of Example 1, a four-stage resilient acrylic graft polymer of the following composition was made with the sequence of steps indicated.

| Stage 1(5%) | Stage 2(25%) | Stage 3(55%) | Stage 4(15%) |
|---|---|---|---|
| 24.1 g BA | 140.4 g MMA | 261.5 g BA | 84.6 g MMA |
| 5.7 g S | 9.1 g EA | 61.3 g S | 5.4 g EA |
| 0.6 g ALMA | 0.7 g ALMA | 6.1 g ALMA | |
| 0.23 g SDOSS | 1.52 g SDOSS | 2.52 g SDOSS | |
| Tg −35° C. | Tg +94 | Tg −35° C. | Tg +94° C. |
| Time (Minutes) | | Reaction Steps | |
| 00 | | Add Stage 1 | |
| 10 | | Add 12 ml KPS | |
| 65 | | Add 8 ml KPS | |
| 70 | | Start addition of Stage 2 | |
| 100 | | All of Stage 2 is in | |
| 110 | | Add 25 ml KPS | |
| 115 | | Start addition of Stage 3 | |
| 162 | | All of Stage 3 is in | |
| 165 | | Add 25 ml KPS | |
| 275 | | Add 25 ml KPS | |
| 280 | | Start addition of Stage 4 | |
| 307 | | All of Stage 4 is in | |
| 327 | | Cooled to room temperature | |

The graft polymer was isolated and compounded as in Example 2. The resultant plaque had low haze, and upon subjection to the Gardner Impact test was found to have a GI of 20 in-lb determined by the maximum pass method and exhibited low stress whitening. The ductility value was found to be 100%. The acrylic graft polymer prepared in this Example had a particle size of 0.272 micron.

EXAMPLE 5

Using the procedure of Example 1, a four-stage resilient acrylic graft polymer of the following composition was made with the sequence of steps indicated.

| Stage 1(4%) | Stage 2(20%) | Stage 3(56%) | Stage 4(20%) |
|---|---|---|---|
| 19.1 g BA | 112.3 g MMA | 266.8 g BA | 113.0 g MMA |
| 4.5 g S | 7.2 g EA | 62.5 g S | 7.2 g EA |
| 0.2 g EDMA | 0.5 g ALMA | 6.7 g ALMA | |
| 0.2 g SDOSS | 1.2 g SDOSS | 2.5 g SDOSS | |
| Tg −35° C. | Tg +94° C. | Tg −35° C. | Tg +94° C. |
| Time (Minutes) | | Reaction Steps | |
| 00 | | Add Stage 1 | |
| 15 | | Add 10 ml KPS | |
| 50 | | Start addition of Stage 2 | |
| 74 | | All of Stage 2 is in | |
| 95 | | Add 25 ml KPS | |
| 100 | | Start addition of Stage 3 | |
| 154 | | Add 25 ml KPS | |
| 159 | | All of Stage 3 is in | |
| 287 | | Add 12 ml KPS | |
| 292 | | Start addition of Stage 4 | |
| 331 | | All of Stage 4 is in | |
| 356 | | Cooled to room temperature | |

The graft polymer was isolated and compounded as in Example 2. The resultant plaque had low haze, and upon subjection to the Gardner Impact test was found to have a GI value of 6 in-lb determined by the maximum pass method, and exhibited low stress whitening. The ductility value was found to be 100%. The acrylic graft polymer prepared in this Example had a particle size of 0.245 micron.

EXAMPLE 6

Using the procedure of Example 1, a four-stage resilient acrylic graft polymer of the following composition was made with the sequence of steps indicated.

| Stage 1(6%) | Stage 2(24%) | Stage 3(40%) | Stage 4(30%) |
|---|---|---|---|
| 36.0 g EA | 144.0 g MMA | 190.6 g BA | 169.2 g MMA |
| 0.3 g SDOSS | 0.4 g ALMA | 44.7 g S | 10.8 g EA |
| | 2.0 g SDOSS | 4.7 g ALMA | 0.40 g n-butyl-mercaptan (n-BM) |
| | | 1.0 g MAA | |
| | | 1.15 g SDOSS | |
| Tg −21° C. | Tg +105° C. | Tg −35° C. | Tg +94° C. |
| Time (Minutes) | | Reaction Steps | |
| 00 | | Add Stage 1 | |
| 15 | | Add 10 ml KPS | |
| 72 | | Start addition of Stage 2 | |
| 94 | | All of Stage 2 is in | |
| 114 | | Add 25 ml KPS | |
| 119 | | Start addition of Stage 3 | |
| 144 | | Add 20 ml KPS | |
| 147 | | All of Stage 3 is in | |
| 212 | | Add 12 ml KPS | |
| 217 | | Start addition of Stage 4 | |
| 271 | | All of Stage 4 is in | |
| 291 | | Cooled to room temperature | |

The graft polymer was isolated and compounded as in Example 1. The resultant plaque had low haze, and upon subjection to the Gardner Impact test was found to have a GI value of 20 in-lb determined by the Bruceton method, and exhibited low stress whitening. The ductility value was found to be 78%. The acrylic graft polymer prepared in this Example had a particle size of 0.174 micron.

EXAMPLE 7

Using the procedure of Example 1, a four-stage resilient acrylic graft polymer of the following composition was made with the sequence of steps indicated.

| Stage 1(6%) | Stage 2(24%) | Stage 3(40%) | Stage 4(30%) |
|---|---|---|---|
| 7.2 g MMA | 144.0 g MMA | 190.6 g BA | 169.2 MMA |
| 28.8 g EA | 0.4 g ALMA | 44.7 g S | 10.8 g EA |
| 0.5 g SDOSS | 2.0 g SDOSS | 4.7 g ALMA | 0.45 g n-BM |
|  |  | 1.0 g MAA |  |
|  |  | 1.15 g SDOSS |  |
| Tg −4° C. | Tg +105° C. | Tg −35° C. | Tg +94° C. |
| Time (Minutes) | Reaction Steps | | |
| 00 | Add Stage 1 | | |
| 15 | Add 10 ml KPS | | |
| 60 | Start Addition of Stage 2 | | |
| 84 | All of Stage 2 is in | | |
| 104 | Add 25 ml KPS | | |
| 109 | Start addition of Stage 3 | | |
| 134 | Add 20 ml KPS | | |
| 137 | All of Stage 3 is in | | |
| 253 | Add 12 ml KPS | | |
| 258 | Start addition of Stage 4 | | |
| 309 | All of Stage 4 is in | | |
| 329 | Cooled to room temperature | | |

The graft polymer was isolated and compounded as in Example 1. The resultant plaque had low haze, and upon subjection to the Gardner Impact test was found to have a GI value of 14 in-lb determined by the Bruceton method, and exhibited low stress whitening. The ductility value was found to be 100%. The acrylic graft polymer prepared in this Example had a particle size of 0.203 micron.

EXAMPLE 8

A. Into a 10 gallon stainless steel reactor was placed 20,000 g of demineralized water, 381 g BA, 87 g S, 9.0 g ALMA and 3.6 g SDOSS. The mixture (Stage 1) was vigorously agitated and the vessel was evacuated to about −25 inches of Hg for 30 seconds and then pressurized to 7 psi with nitrogen. The nitrogen was then vented to a final pressure of 2 psi. During this time the temperature was raised to 80° C. Thirteen minutes after starting agitation, agitation was reduced by about half. At 15 minutes 60 ml of KPS (2% $K_2S_2O_8$ in demineralized water) was added. This was repeated at 48 minutes. At 109 minutes a mixture (Stage 2) of 2820 g MMA, 180 g EA, 12 g ALMA and 30 g of SDOSS was gradually pumped into the reactor. An additional 60 ml of KPS was added at 110 minutes. At 126 minutes all of Stage 2 was in the reactor. At 150 minutes an additional 250 ml KPS was added followed by gradually pumping in Stage 3 which consisted of 4863 g BA, 1110 g S, 110 g ALMA and 47 g SDOSS. At 186 minutes 250 ml of KPS was added and at 190 minutes all of Stage 3 was in the reactor. At 327 minutes 80 ml KPS was added and at 330 minutes Stage 4, consisting of 2256 g MMA and 144 g EA, was gradually pumped into the reactor.

All of Stage 4 was in at 354 minutes and the reaction was allowed to proceed for an additional 16 minutes after which time it was cooled to room temperature.

Isolation

The polymer latex was diluted 1 to 1 with demineralized (DM) water. It was then gradually pumped (0.5 gallon/minute) into a stirred 55 gallon drum containing a hot (50°–60° C.) solution of 17 gallons of DM water and 625 g Epsom salt. After coagulation was complete the mother liquor was drained off and the coagulated polymer was washed 3 times with hot (55° C.) DM water. It was then dried in a vacuum oven overnight to obtain a resilient acrylic graft polymer (particle size was not measured).

Compounding and Testing

A blend of 20 lbs. of the graft polymer and 30 lbs. of Lucite ® 47F (MMA/EA; 94/6) was prepared with a drum tumbler. This blend was then extruded in a twin screw extruder at about 150 pph and a melt temperature of about 270° C. The resulting melt-compounded, pelletized product was then extruded in a single screw extruder equipped with a sheeting die. The resulting sheet was 68–75 mils thick, had very low haze, had a GI value of 27 in-lb (Bruceton method) and low stress whitening. This composition is at least 27 times tougher than sheet produced from Lucite ® 47F alone. Ductility was observed to be about 100%.

B. Into a 10-gallon stainless steel reactor was placed 20,000 g of demineralized water, 381 g BA, 87 g S, 9.0 g ALMA and 3.6 g SDOSS. The mixture (Stage 1) was vigorously agitated (250) rpm) and the vessel was evacuated to about −25 inches of Hg for 30 seconds and then pressurized to 7 psi with nitrogen. The nitrogen was then vented to a final pressure of 2 psi. During this time the temperature was raised to 78° C. Twelve minutes after starting agitation, agitation was reduced by about half. At 15 minutes, 120 ml of KPS (2% $K_2S_2O_8$ in demineralized water) was added. Temperature was raised to 80° C. at 16 minutes. At 40 minutes 80 ml more of KPS was added. At 45 minutes, a mixture (Stage 2) of 2808 g MMA, 180 g EA, 12 g ALMA and 30 g of SDOSS was gradually pumped into the reactor. At 72 minutes, all of Stage 2 was in the reactor. An additional 250 ml of KPS was added at 95 minutes. At 100 minutes, Stage 3 which consisted of 5342 g BA, 1243 g S, 134 g ALMA and 54 g SDOSS was gradually pumped into the reactor. At 139 minutes, 250 ml of KPS was added and at 144 minutes all of Stage 3 was in the reactor. At 275 minutes, 120 ml KPS was added and at 280 minutes Stage 4, consisting of 1808 g MMA and 117 g EA, was gradually pumped into the reactor.

All of Stage 4 was in at 307 minutes and the reaction was allowed to proceed for an additional 23 minutes after which time it was cooled to room temperature.

Stage 1 was 4% of total and had a Tg of −35; stage 2 was 25% with Tg of +96; stage 3 was 55 percent with Tg of −35; and stage 4 was 15% with Tg of +96.

Isolations and Testing

The rubber was isolated as in Example 8. The final latex particle size was 0.275 microns. It was then compounded and compression molded as in Example 1 except that graft polymer in the blend was 40% and the copolymer contained 16% EA and 94% MMA.

The following physical properties were obtained:

| Gardner Impact* | Tensile Strength | % Elongation |
|---|---|---|
| 25 In.-Lb | 5180 psi | 32 |

*Determined by Bruceton method.

Stress whitening was low and ductility was observed to be about 100%.

EXAMPLE 9

Using the general procedure of Example 1, the following charges were consecutively placed in a 3-liter resin kettle and each reacted to obtain a four-stage resin of this invention and a three-stage resin not covered by this invention.

Four-Stage Resin of this Invention

| Stage 1 Charge (elastomeric) | Stage 2 Charge (non-elastomeric) |
|---|---|
| 10.9 g styrene (S) | 113.5 g MMA |
| 48.0 g butylacrylate (BA) | 6.0 g ethylacrylate (EA) |
| 1.2 g allylmethacrylate (ALMA) | 0.5 g ALMA |
| 0.60 g Aerosol-OT (75% soln.) (A-OT) | 1.20 g A-OT |

| Stage 3 Charge (elastomeric) | Stage 4 Charge (non-elastomeric) |
|---|---|
| 59.9 g S | 85.5 g MMA |
| 263.6 g BA | 4.5 g EA |
| 6.5 g ALMA | |
| 3.30 g A-OT | |

| Time | Reaction Temp., °C. | Remarks |
|---|---|---|
| 0 | 79 | Added 26 ml of monomer charge Stage 1 |
| 15 | 80 | Added 12 ml of KPS |
| 35 | 80 | Added 12 ml of KPS |
| 40 | 80 | Started feeding rest of Stage 1 at approx. 4 ml/min. |
| 50 | 80 | All of Stage 1 added |
| 110 | 81 | Added 12 ml KPS |
| 115 | 80 | Started feeding Stage 2 at approx. 5 ml/min |
| 140 | 80 | All of Stage 2 added |
| 155 | 80 | Added 25 ml of KPS |
| 160 | 80 | Started feeding Stage 3 at approx. 8 ml/min |
| 200 | 80 | Added 25 ml of KPS |
| 204 | 80 | All of Stage 3 added |
| 305 | 81 | Added 12 ml KPS |
| 310 | 80 | Started feeding Stage 4 at approx. 3 ml/min |
| 339 | 81 | All of Stage 4 added |
| 365 | 80 | Cooled batch to room temp. |

Three-Stage Resin

| Stage 1 Charge (non-elastomeric) | Stage 2 Charge (elastomeric) |
|---|---|
| 170.3 g MMA | 59.9 g S |
| 9.0 g EA | 263.6 g BA |
| 0.7 g ALMA | 6.5 g ALMA |
| 1.80 g A-OT | 3.30 g A-OT |

Stage 3 Charge (non-elastomeric)
85.5 g MMA
4.5 g EA

| Time | Reaction Temp., °C. | Remarks |
|---|---|---|
| 0 | 79 | Added 52 ml monomer charge Stage 1 |
| 15 | 79 | Added 15 ml KPS |
| 30 | 81 | Started feeding rest of Stage 1 at approx. 5 ml/min |
| 60 | 80 | All of Stage 1 added |
| 75 | 80 | Added 25 ml KPS |
| 80 | 80 | Started feeding Stage 2 at approx. 8 ml/min |
| 120 | 80 | Added 25 ml of KPS |
| 127 | 80 | All of Stage 2 added |
| 227 | 81 | Added 12 ml KPS |
| 232 | 80 | Started feeding Stage 3 at approx. 3 ml/min |
| 264 | 81 | All of Stage 3 added |
| 289 | 80 | Cooled batch to room temp. |

Each resin was isolated by evaporating the latex to dryness in vacuum at 70°–90° C. and compounded as described in Example 1 with a MMA/EA (95/5) copolymer. They were compression molded at 240° C. and 40,000 lb force into approximately 40 mil plaques for tensile testing and 12 mil films for fold endurance testing. 7 mil films were made by pressing at 250° C.

The Table following records the percent of each Stage, the Tg of each stage and the particle size of the resin.

TABLE 1

| | Stages[1] | | | | | | | | Final Part. Size, Microns |
|---|---|---|---|---|---|---|---|---|---|
| | 1 | | 2 | | 3 | | 4 | | |
| | % | Tg | % | Tg | % | Tg | % | Tg | |
| Four-Stage Resin | 10 (4% seed) | −35 | 20 | +96 | 55 | −35 | 15 | +96 | 0.280 |
| Three-Stage Resin | | | 30 (8% seed) | +96 | 55 | −35 | 15 | +96 | 0.282 |

[1]Tg's were calculated.

It is seen that the last two stages of each resin are identical in composition and amount present, and that the only difference is that the core portion of the three stage resin is non-elastomeric and comprises 30% of the total whereas in the four stage resin the core is 10% elastomeric with a 20% non-elastomeric second stage.

Results of the Fold Endurance Test are as follows (in this Table loadings in MMA/EA blend are provided, along with film thickness and number of samples tested.

TABLE 2

FOLDING ENDURANCE TEST

| Composition | % Loading of Acrylic Graft Polymer in MMA/EA Resin | Film Thickness (Mils) | No. of Samples | Bends to Break[1] |
|---|---|---|---|---|
| Three-stage Resin | 32 | 11.5 ± 0.4 | 9 | 2.8 ± 1.1 |
| Four-stage Resin | 32 | 11.1 ± 0.2 | 10 | 3.1 ± 1.3 |
| Three-stage Resin | 50 | 12.8 ± 0.3 | 12 | 9.0 ± 3.1[2] |
| Four-stage Resin | 50 | 13.2 ± 0.4 | 9 | 12.6 ± 4.1[2] |
| Three-stage Resin | 50 | 7.4 ± 0.4 | 16 | 31.0 ± 8.4[3] |
| Four-stage Resin | 50 | 7.5 ± 0.5 | 16 | 4.24 ± 12.4[3] |

[1] No. of 180° bends to break.
[2] Based on statistical analysis carried out by the Variance Stabilizing Transformation method (See Advanced Theory of Statistics, M. G. Kendall and A. Stuart, Vol. 3, 2nd Edition, page 89) the improvement of 40% (12.6 versus 9.0) is realizable with a greater than 95% degree of confidence.
[3] Based on the same statistical analysis described in footnote 2, the improvement of 37% (42.4 versus 31.0) is realizable with a greater than 95% degree of confidence.

It is evident from the % improvement values that four-stage resin of this invention exhibited better fold endurance at each loading level and particularly the higher levels for each film thickness tested.

Results of tensile property, Gardner Impact, and ductility tests showed no significant difference between these three stage and four stage resins.

EXAMPLE 10

Using the general procedure of Example 1, a four stage resin with 20% elastomeric first stage was prepared and compared with a three stage resin. The following charges were prepared to produce stages in the amounts shown to obtain the two resins.

Four Stage Resin of this Invention

| Stage 1 (20%) | Stage 2 (10%) | Stage 3 (55%) | Stage 4 (15%) |
|---|---|---|---|
| 96.0g BA | 56.8g MMA | 263.6g BA | 85.5g MMA |
| 21.8g S | 3.0g EA | 59.9g S | 4.5g EA |
| 2.4g ALMA | 0.25g ALMA | 6.5g ALMA | |
| 1.20g SDOSS | 0.60g SDOSS | 3.30g SDOSS | |

| Time (minutes) | Reaction Steps |
|---|---|
| 00 | Add 20ml of Stage 1 |
| 15 | Add 12ml KPS |
| 35 | Add 12ml KPS |
| 40 | Start addition of remainder of Stage 1 |
| 70 | All of Stage 1 is in |
| 75 | Add 12ml KPS |
| 158 | Add 12ml KPS |
| 163 | Start addition of Stage 2 |
| 178 | All of Stage 2 is in |
| 193 | Add 25ml KPS |
| 198 | Start addition of Stage 3 |
| 240 | Add 25ml KPS |
| 244 | All of Stage 3 is in |
| 344 | Add 12ml KPS |
| 349 | Start addition of Stage 4 |
| 379 | All of Stage 4 is in |
| 399 | Cooled to room temperature |

Particle size was 0.340 microns.

Three Stage Resin

| Stage 1 (30%) | Stage 2 (55%) | Stage 3 (15%) |
|---|---|---|
| 170.3g MMA | 263.6g BA | 85.5g MMA |
| 9.0g EA | 59.9g S | 4.5g EA |
| 0.7g ALMA | 6.5g ALMA | 4.5g EA |
| 1.80g SDOSS | 3.30g SDOSS | |

| Time (minutes) | Reaction Steps |
|---|---|
| 00 | Add 38ml of Stage 1 |
| 15 | Add 15ml KPS |
| 30 | Start addition of remainder of Stage 1 |
| 62 | All of Stage 1 is in |
| 82 | Add 25ml KPS |
| 87 | Start addition of Stage 2 |
| 125 | Add 25 ml KPS |
| 149 | All of Stage 2 is in |
| 250 | Add 12ml KPS |
| 255 | Start addition of Stage 3 |
| 286 | All of Stage 3 is in |
| 311 | Cooled to room temperature |

Particle size was 0.320 microns.

Percent stages, resin particle size, and Tg of each stage are summarized as follows:

| | Stages | | | | | | | | Final Part. Size, Microns |
|---|---|---|---|---|---|---|---|---|---|
| | 1 | | 2 | | 3 | | 4 | | |
| | % | Tg* | % | Tg | % | Tg | % | Tg | |
| Three stage resin | | | 30 (5% seed) | +96 | 55 | −35 | 15 | +96 | 0.320 |
| Four stage resin | 20 (3% seed) | −35 | 10 | +96 | 55 | −35 | 15 | +96 | 0.340 |

*Calculated Tg's, °C.

The resins were isolated as in Example 9 and compounded as in Example 1 with 95/5 MMA/EA at 32% loadings and 50% loading of the acrylic graft polymer. The compounded resins were tested for Gardner impact values with the following results:

GARDNER IMPACT TOUGHNESS

| Three Stage Resin Blend 30/55/15 | Four Stage Resin Blend 20/10/55/15 |
|---|---|
| 50% Loading | 50% Loading |
| 30.1 | 37.0 |
| 31.5 | 45.3 |
| 34.6 | 39.2 |
| 32.1 ± 2.3 | 40.5 ± 4.3 |
| 32% Loading | 32% Loading |

| Three Stage Resin Blend 30/55/15 | Four Stage Resin Blend 20/10/55/15 |
| --- | --- |
| 14.7 | 13.1 |
| 15.6 | 18.1 |
| 15.6 | 15.8 |
| 15.3 ± 0.5 | 14.8 |
|  | 15.5 ± 2.1 |

It is seen that at 32% loading acrylic graft polymer, there is no significant difference in Gardner Impact toughness, but at a 50% loading, the four stage polymer used in this Example gave a 26% improvement. No significant difference in stress whitening or ductility was observed. Tensile strengths were not measured.

I claim:

1. A resilient, acrylic, multi-stage, sequentially produced polymer characterized by
    (a) an elastomeric first stage comprising about 1–20% by weight of the polymer and having a glass transition temperature of between about −60° C. and 25° C., which is polymerized from a monomer mixture of 50 to 100 weight percent of at least one alkyl acrylate wherein the alkyl group contains 1 to 8 carbon atoms, 0 to 50 weight percent of another copolymerizable monoethylenically unsaturated monomer, 0 to 5 weight percent of a copolymerizable polyfunctional crosslinking monomer and 0 to 5 weight percent of a copolymerizable graftlinking monomer;
    (b) a nonelastomeric, relatively hard second stage comprising about 15–65% by weight of the polymer and having a glass transition temperature greater than 25° C., which is polymerized in the presence of the first stage product from a monomer mixture of 70 to 100 weight percent of at least one alkyl methacrylate wherein the alkyl group has 1 to 4 carbon atoms, 0 to 30 weight percent of another copolymerizable monoethylenically unsaturated monomer, 0 to 5 weight percent of a copolymerizable polyfunctional crosslinking monomer and 0 to 5 weight percent of a copolymerizable graftlinking monomer;
    (c) an elastomeric third stage, comprising about 30–75% by weight of the polymer and having a glass transition temperature of between about −60° and 25° C., which is polymerized in the presence of the first and second stage product from a monomer mixture of 50 to 100 weight percent of at least one alkyl acrylate wherein alkyl group contains 1 to 8 carbon atoms, 0 to 50 weight percent of another copolymerizable monoethylenically unsaturated monomer, 0 to 5 weight percent of a copolymerizable polyfunctional crosslinking monomer and 0 to 5 weight percent of a copolymerizable graftlinking monomer;
    (d) a nonelastomeric, relatively hard fourth stage comprising about 5–40% by weight of the polymer and having glass transition temperature greater than 25° C. which is polymerized in the presence of the first, second and third stage product from a monomer mixture of 70 to 100 weight percent of at least one alkyl methacrylate wherein the alkyl group has 1 to 4 carbon atoms, 0 to 30 weight percent of another copolymerizable monoethylenically unsaturated monomer, 0 to 5 weight percent of a copolymerizable polyfunctional crosslinking monomer and 0 to 5 weight percent of a copolymerizable graftlinking monomer; said first and third stage combined comprising at least 40 percent by weight of the polymer.

2. The polymer of claim 1 wherein:
    the elastomeric first stage comprises about 3–10% by weight of the polymer,
    the nonelastomeric second stage comprises about 20–30% by weight of the polymer,
    the elastomeric third stage comprises about 40–60% by weight of the polymer, and
    the nonelastomeric fourth stage comprises about 10–20% by weight of the polymer.

3. The polymer of claim 2 wherein the glass transition temperature of each of the elastomeric first stage and the elastomeric third stage is between about −35° C. and −20° C.

4. The polymer of claim 1 wherein the alkyl acrylate present in the elastomeric first stage and in the elastomeric third stage is butyl acrylate.

5. The polymer of claim 4 wherein the alkyl methacrylate present in the nonelastomeric second stage and the nonelastomeric fourth stage is methyl methacrylate.

6. The polymer of claim 4 wherein the monomer mix of the nonelastomeric second stage contains methyl methacrylate, ethyl acrylate and allylmethacrylate; and the monomer mix of the nonelastomeric fourth stage contains methyl methacrylate and ethyl acrylate.

7. A blend of 5–80 percent by weight of the resilient, acrylic graft polymer defined in claim 1 with 20–95 percent by weight of a nonresilient thermoplastic methacrylate resin.

8. A blend of 5–80 percent by weight of the resilient acrylic graft polymer defined in claim 5 with 20–95 percent by weight of a nonresilient thermoplastic methacrylate resin which is a copolymer of methyl methacrylate and ethyl acrylate.

9. The polymer of claim 1 wherein the elastomeric first stage comprises 3–20% by weight of the polymer.

10. A blend of 5–80 percent by weight of the resilient, acrylic graft polymer defined in claim 9 with 20–95 percent by weight of a nonresilient thermoplastic methacrylate resin.

11. The polymer of claim 1 wherein the elastomeric first stage comprises 10–20% by weight of the polymer.

12. A blend of 5–80 percent by weight of the resilient, acrylic graft polymer defined in claim 11 with 20–95 percent by weight of a nonresilient thermoplastic methacrylate resin.

13. The polymer of claim 1, 9 or 11 wherein the elastomeric first stage contains a seed.

14. A blend of 5–80 percent by weight of the resilient, acrylic graft polymer defined in claim 13 with 20–95 percent by weight of a nonresilient thermoplastic methacrylate resin.

* * * * *